United States Patent [19]

Gryger et al.

[11] 4,415,984
[45] Nov. 15, 1983

[54] SYNCHRONOUS CLOCK REGENERATOR FOR BINARY SERIAL DATA SIGNALS

[75] Inventors: Dana A. Gryger, Downingtown; Daniel P. Drogichen, West Chester, both of Pa.

[73] Assignee: Burroughs Corporation, Detroit, Mich.

[21] Appl. No.: 162,806

[22] Filed: Jun. 25, 1980

[51] Int. Cl.³ .......................... G06F 7/28; G06F 5/06
[52] U.S. Cl. .................................... 364/900; 364/200
[58] Field of Search ... 364/200 MS File, 900 MS File

[56] References Cited

U.S. PATENT DOCUMENTS

| 4,034,348 | 7/1977 | Rathbun | 364/900 |
| 4,034,352 | 7/1977 | Hotchkiss | 364/900 |
| 4,048,481 | 9/1977 | Bailey, Jr. et al. | 364/200 |
| 4,056,851 | 11/1977 | Hovagimyan et al. | 364/900 |

Primary Examiner—Gareth D. Shaw
Assistant Examiner—Tim A. Wiens
Attorney, Agent, or Firm—Mark T. Starr; Edmund M. Chung; K. R. Peterson

[57] ABSTRACT

Disclosed is a synchronous clock regenerator for generating a clock signal which can be reliably used to strobe a binary serial data signal. The incoming raw clock signal is fed into a tapped delay line which generates multiple delayed versions of the raw clock signal. Upon detection of a framing transition on the incoming data signal, the raw clock signal and multiple delayed clock signals are latched. The latched values are used to address a read only memory (ROM), the ROM containing codes specifying which, if any, of the set including the raw clock signal and multiple delayed clock signals provides the optimum phase to strobe the incoming data signal. The code read from the ROM is decoded, latched and fed to a 1-of-n selector circuit. Thereafter, and until the next framing transition occurs, each raw clock pulse received is replaced by the corresponding one of the set of that raw clock pulse and the generated delayed versions of that raw clock pulse as selected by the previously latched inputs to the 1-of-n selector.

12 Claims, 4 Drawing Figures

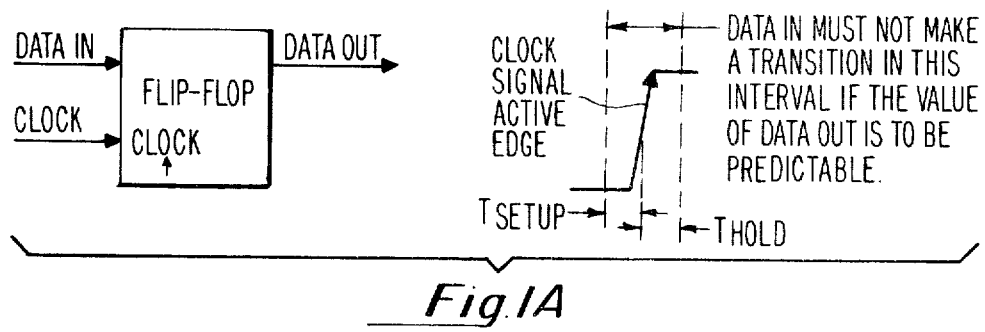
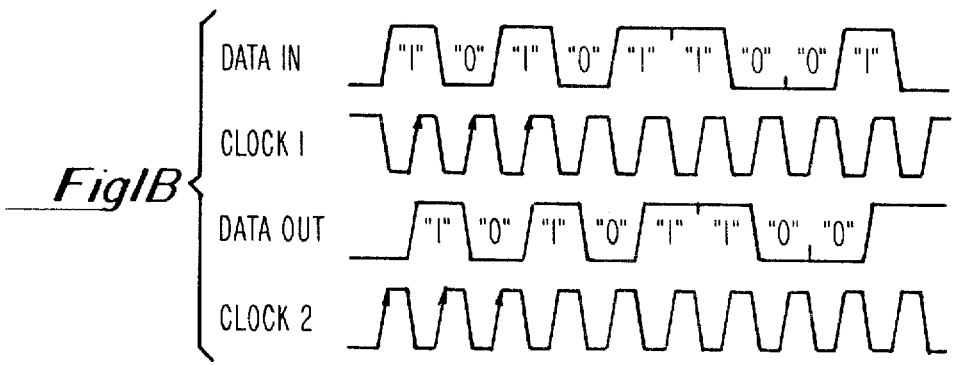
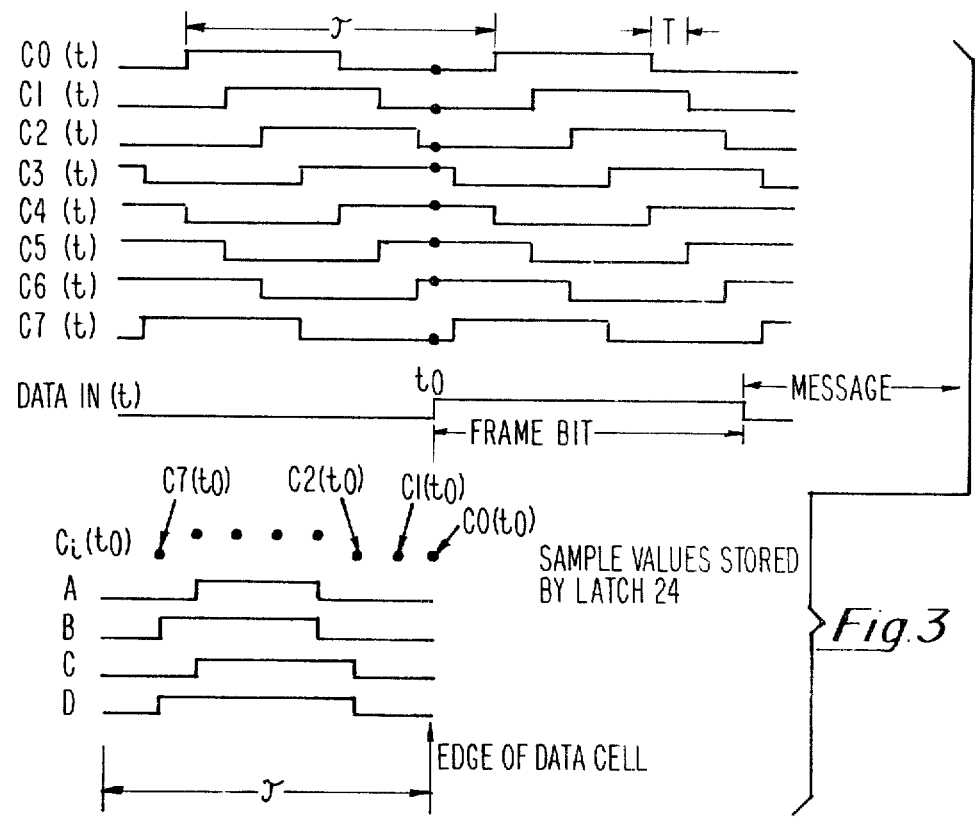

SYNCHRONOUS CLOCK REGENERATOR FOR BINARY SERIAL DATA SIGNALS

BACKGROUND OF THE INVENTION

In digital systems, a common technique for transferring binary data between first and second elements of the digital system is to serialize the data and shift it one bit at a time onto a message interface line interconnecting the first and second elements. In most arrangements of this type, the message interface line does not transfer information as to the rate at which the transmitting element is shifting data bits onto the message line. Since the receiving element cannot decipher the transferred information without this rate information, both transmitting and receiving elements normally have access to a clock which is utilized by both transmitting and receiving elements to define the message bit rate on the message interface line. The clock may be supplied by the transmitting element, the receiving element or, in situations characterized by slow message rates and short message lengths, it may be generated separately by both the transmitting and receiving elements.

In a typical digital system, the transmission frequency of the data signal and (any) clock signal is not measurably affected by the length of the interface line or the number or type of intervening system elements between the transmitting and receiving elements. However, the length of the interface line and the presence of intervening system elements does introduce significant transmission delays between the transmitting and receiving elements. The magnitude of this delay can be many multiples of the message rate period, and its precise values for all systems built to identical design specifications may not be quantifiable by the designer with better resolution than a significant fraction of, or even multiples of, the message rate period. Thus, even in the most simple system where the transmitting element transmits data and clock information to the receiving element on separate interface lines, the difference between the delays of the data and clock signals may not be quantifiable with better resolution than previously stated. The effect of these delays is that while the clock signal can be reliably used to indicate the frequency with which data bits appear on the message interface line, it provides insufficient (or no) information regarding the points at which one data bit ends and the next begins; viz, no phase information is available.

In many digital data communication systems, it is desirous to be able to utilize the clock signal to strobe the received data into a flip-flop which may, for example, be the first element of a shift register. Typically this flip-flop responds to one edge of the clock. Thus, for example, the flip-flop may respond to the clock's transition from a low to a high level by latching the data signal presented to its input. Those skilled in the art will appreciate that a typical flip-flop will not respond predictably if its data input is changing state during a small time interval on either side of the active (or used) edge of the clock. These time intervals on either side of the clock, known as setup and hold times, are graphically illustrated in FIG. 1A. Thus, when the active edges of the clock occur sufficiently far from the data transitions (as defined by $T_{SETUP}$ and $T_{HOLD}$) as in the case for CLOCK-1 in FIG. 1B, the flip-flop's output reliably reproduces the message, as can be seen from the DATA-OUT waveform. To the contrary, if the CLOCK-2 signal shown in FIG. 1B was used to strobe DATA-IN, the DATA-OUT values produced might not reliably reproduce the message since the active edges of CLOCK-2 are nearly coincident with the DATA-IN transitions.

With the latter discussion in mind, those skilled in the art will readily appreciate how the above described clocking condition manifests itself in a data communications system. Thus, in a typical data communications system, a receiving element (or receiver) receives a clock signal of the same frequency as the received data, but with arbitrary phase relationship to the received data. In addition, the beginning of each message typically consists of a known, specified pattern on the data line which is utilized to frame the message. Thus, for example, many existing message protocols start with the transition from the quiescent (or no message) state of the data interface line to the alternate state, for one or more message bit times known as mark bits. These mark bits contain no message information, but instead indicate that the subsequent n-bits received constitute a message. As an alternative to the use of mark bits, the system protocol may be specified so that each time it is necessary to generate the proper clock, a special message with no other purpose but to provide framing information is sent to the receiving element. Upon receipt of the framing signal, it is the job of the receiver to generate a clock signal of the same frequency as the received clock signal, but one that will insure that the phase relationship to the received data is such that active clock edges occur sufficiently far from data transitions to allow for reliable strobing of the data signals.

In the prior art, multiple techniques for insuring that the clock signals are in proper phase with respect to the data signals have been utilized.

One of such prior art techniques, typically employed in asynchronous datacom systems, uses a clock with a frequency which is a multiple of the message's (data) frequency to sample the incoming data signal at the higher clock frequency. The multiplicity of samples per data bit allows the samples at the edge of the data cells to be incorrect, while the center of the data cell can be reliably detected and sampled. This technique also tolerates variations in the frequencies of the clock and data since the sampling clock frequency is not required to be a precise mutiple of the data frequency. This technique is thus applicable to the previously discussed configuration wherein the clock signal is generated separately by both transmitter and receiver. The drawback of this technique is in the requirement of the higher frequency clock, which in a typical asynchronous datacom system is eight or sixteen times the data frequency. Because of this requirement, the clock may be impractical to generate for high data frequencies.

A second prior art solution to the problem, presently utilized in synchronous datacom systems, is to limit the message frequency, in combination with the length (and therefore the delay) of the interface path between transmitter and receiver, such that the clock/data skew is never large enough to move the active edge of the clock signal to a point too close to the edge of the data cell. The obvious disadvantage of this technique is that it limits either the data rate or the length of the interface, or both. This disadvantage may be partially overcome by utilizing repeater stations close enough together to satisfy the limiting criteria on skew, and then resynching (or reestablishing) the zero-skew condition at each repeater station. However, the use of repeater stations may be undesirable since they significantly add to the cost of the system.

Another prior art approach to the problem presented, typically utilized in signal modulation schemes, is to use a self-clocking or Manchester coding scheme for the data. In such a coding scheme, both the clock and data signals are multiplexed onto a single signal line, which thus contains both the data and data rate information. Thus, in a typical application, the signal makes one or two transitions per data bit period, with one transition indicating a binary zero and two transitions indicating a binary one. Since the self-clocking approach utilizes only one channel, there is no possibility for differential clock and data delays. The major drawback of the self-clocking scheme is that the single channel must have a larger capacity than the message rate. Typically, the channel must be capable of transmitting information at a rate at least twice the rate at which data is effectively transferred. Thus, in many situations it may be infeasible or much more expensive to provide one channel with a capacity of 2X rather than two channels each with a capacity of 1X. As a further disadvantage, the data separator (or demodulator) required to extract the data signal from the multiplexed clock/data signal is often expensive to implement.

In yet another approach to the problem, circuitry is provided to select one edge of the received clock signal to use to strobe the data, the selection being based on which edge is identified by the circuitry as being close to the center of the data cell. The circuitry employs a tapped delay line, whose input is the received data signal, to generate a timing window. The first clock edge (rising or falling) which occurs within the window is selected for use to strobe the data. If neither edge occurs within this window, one edge is arbitrarily selected. This approach suffers from the fact that under some within-specification values of clock frequency, clock asymmetry and data asymmetry, both edges of the clock signal could be too close to the edge of the data cell; viz, neither is usable. However, in such a case, since one clock edge is arbitrarily chosen if neither is within the generated timing window, it is possible to select and use an unusable clock edge. Although eliminating the default selection of one edge if neither occurs within the window would seem to be an acceptable modification to overcome this drawback, it in fact is not since it could result in the rejection of perfectly within-specification clock/data signals.

OBJECT OF THE INVENTION

It is a general object of the present invention to eliminate these and other drawbacks of the prior art by providing an improved synchronous clock regenerator for binary serial data signals.

It is another object of the present invention to provide a clock regenerator which generates a clock signal which can be reliably used to strobe a binary serial data signal.

It is a further object of the present invention to provide a clock regenerator which compensates for the difference between the delays of received data and clock signals.

It is still another object of the present invention to provide a clock regenerator for binary serial data which generates a clock signal of the same frequency as that given, but with phase relationship to the given data such that active clock edges occur sufficiently far from data transitions to allow reliable strobing of the data signal.

These and other objects, features and advantages of the present invention will become more apparent from the detailed description of the preferred embodiment when read in conjunction with the drawings.

SUMMARY OF THE INVENTION

In accordance with the present invention, the incoming raw clock signal with arbitrary phase is fed into a tapped delay line which generates multiple delayed versions of the raw clock signal. The raw clock signal and the multiple delayed clock signals are connected as inputs to a multiple position latch which is strobed upon detection of a framing transition on the associated incoming data line.

The data stored in the multiple position latch (which represents characteristics of the raw clock signal) is used as the address input to a read only memory (ROM), each word of the ROM containing user determined data specifying which one of the set of multiple delayed versions and the raw timing signal provide optimum phase to strobe the data on the associated incoming data line. The data output of the ROM is fed into a latch/decoder which is strobed after allowing sufficient time for the data read from the ROM to become valid.

The latch/decoder decodes the bit pattern of the data read from the ROM to determine if any of the set of multiple delayed clock signals and the raw timing signal is suitable as a clock for the incoming data. If none is suitable, the latch/decoder transmits an unacceptable clock status signal to the associated controlling logic. Alternately, the latch/decoder provides selection inputs to a 1-of-(n+1) selector, the data inputs to the 1-of-(n+1) selector consisting of the set of multiple delayed clock signals and the raw timing signal. Thereafter, and until the next unmasked framing transition occurs, each raw clock pulse received is replaced by the corresponding one of the set of that raw clock pulse and the generated delayed versions of that raw clock pulse as selected by the previously latched inputs to the 1-of-(n+1) selector.

Optionally, the present clock regeneration circuit may include an equalizing delay in the associated incoming data line to compensate for the delay introduced by the 1-of-(n+1) selector.

BRIEF DESCRIPTION OF THE DRAWINGS

FIG. 1A graphically illustrates the set-up and hold times characteristic of a typical flip-flop circuit.

FIG. 1B is a timing diagram illustrating the effects of active clock edges occurring sufficiently far from data transitions so as to insure that a flip-flop's output reliably reproduces its input.

FIG. 3 is a timing diagram showing the relationship between the raw timing and data signals received by the circuit of FIG. 2 and the plurality of timing signals generated, one of which is selected by the circuit to strobe the data received.

DESCRIPTION OF THE PREFERRED EMBODIMENT

Figure 2:
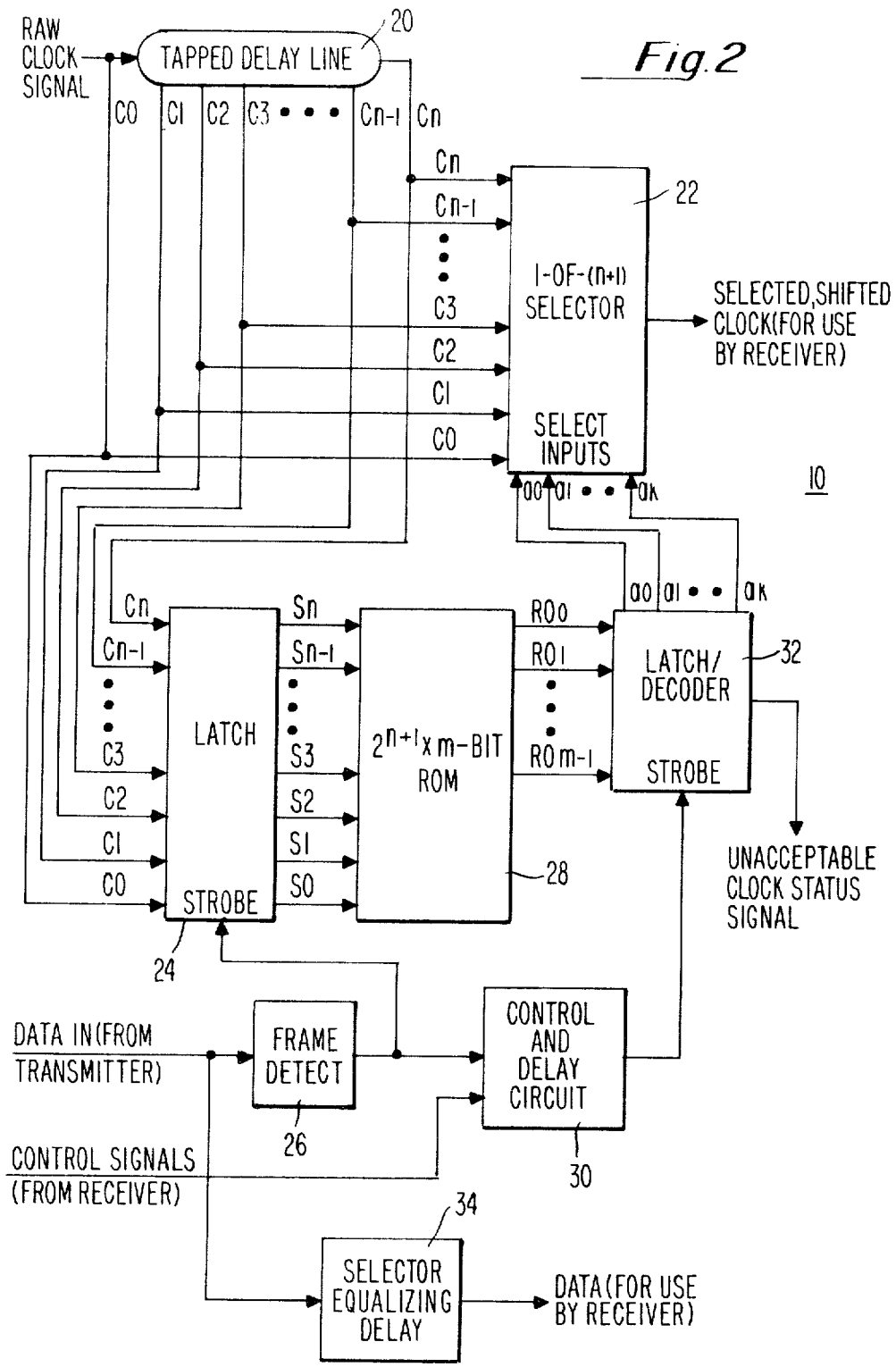
FIG. 2 is a schematic diagram of the synchronous clock regenerator circuit of the present invention.

FIG. 2 is a digital logic diagram showing the preferred embodiment of the clock regeneration circuit 10 of the present invention. In the following description, the clock regeneration circuit 10 will be considered as a separate element from any communication system receiver (not shown) it may be used with. However, those skilled in the art will appreciate that in many applications it will be advantageous to include the clock regeneration circuit 10 as an integral part of the receiver rather than as a separate element.

In order to aid in understanding the operation of the clock regeneration circuit 10 of FIG. 2, the inputs and outputs of the circuit 10 will be defined. The inputs to the circuit 10 are as follows:

Binary serial data from a transmitter (or transmitting element) is received and input to the frame detect 26 and selector-equalizing delay 34 circuits.

The raw clock signal, having the same frequency as the binary serial data, but with arbitrary phase relationship to the binary serial data, is received and inputted to delay line 20, selector 22, and latch 24.

A small number of digital control signals which enable the present invention to generate the required clock signal when desired are generated by the receiver and inputted to the control and delay circuit 30. A more detailed definition of these control signals will be supplied below.

The outputs from the circuit 10 are as follows:

The generated clock signal, with phase relationship to the data such that active clock edges occur sufficiently far from data transitions to allow reliable strobing of the output data signal, is provided at the output of selector circuit 22.

A reproduction of the data signal input to frame detector 26 and selector-equalizing delay circuit 34, which may be either unaltered or delayed by a constant time (depending on factors that will be explained) is provided at the output of selector-equalizer delay circuit 34.

An (optional) "unacceptable clock" status signal which indicates that the raw clock signal is of unacceptable frequency, asymmetry or is otherwise unsuitable for use, is provided at the output of latch/decoder 32.

In operation, the raw clock signal received is input to a tapped delay line 20, whose total delay approximates the maximum expected clock period $\tau$ of the raw clock. The delay line 20 is effective to reproduce at each of its output pins the raw clock delayed by a constant time. Although not a strict requirement, in the preferred embodiment the delay time for each successive tap is a successive integer multiple of some time T. Thus, the signal at each output pin $C_i(t)$ of the delay line 20 in terms of the input signal $C_o(t)$ is given by $$C_i(t) = C_o(t - iT)$$

The delay line 20 must be selected so that $(n+1)T$ is equal to or greater than approximately the largest expected clock period $\tau$, where n is equal to the number of taps in delay line 20. In the preferred embodiment of the present invention, the delay time between each tap is equal. Further, as will be obvious to those skilled in the art, the number of taps (n), their nominal values, and acceptable tolerance depends on the tolerance of the other components in the circuit 10, and the requirements on the proximity of the generated clock's active edges to the data transitions.

The vector of $(n+1)$ delayed clock signals, consisting of the inputted raw clock signal and the n delayed clock signals produced by the delay line 20, is input to latch 24 via lines $C_o$-$C_n$. In the preferred embodiment, latch 24 is made up of an array of $n+1$ flip-flops which store the values of the corresponding $(n+1)$ delayed clock signals when strobed by a common strobe signal at the STROBE input to latch 24. As will be further explained below, this common strobe is generated by the frame detect circuit 26, which examines the DATA-IN line for a framing transition and uses the detected framing transition to define the edge of the data cell.

FIG. 3 is a timing diagram showing the input and output signals from a delay line 20 having seven $(n=7)$ taps, such that a vector of eight equally spaced timing signals is produced. For the case illustrated in FIG. 3, the message framing consists of one high data bit following an arbitrary number of (low) quiescent (no message) bits, the message framing bein followed by some number of message bits. As will be obvious to those skilled in the art, for a message framing protocol such as that illustrated in FIG. 3, the frame detect circuit 26 could be eliminated. In such case, the rising edge of the data signal could be used directly to both strobe latch 24 and as an input to the control and delay circuit 30.

Still referring to FIG. 3, when the DATA-IN (t) signal makes a low-to-high transition at $t_o$, indicating a framing bit and further defining $t_o$ as the edge of a data cell, the framing bit at $t_o$ is detected by frame detect circuit 26, which in response strobes latch 24, thus causing the eight coincident delayed clock signals $c_i(t_o)$ to be stored in latch 24. Each of the eight $C_i(t_o)$ values represents the value of $C_o(t)$ at time i·T before $t_o$; that is, $C_i(t_o) = C_o(t_o - iT)$. This is illustrated by the next waveform $C_i(t_o)$ which shows the eight samples arranged in their corresponding chronological positions before $t_o$. As with any sampled-data system, these samples provide a degree of information about the continuous signal which was sampled, in this case $C_o(t)$. Although there are an infinite number of possible $C_o(t)$ signals which would result in these samples $C_i(t_o)$, they are all relatively similar, as suggested by the four signals A,B,C and D appearing below $C_i(t_o)$, all of which are similar to the actual $C_o(t)$ shown in FIG. 3. Further, those skilled in the art will realize that as in any sampled-data system, taking more samples closer together, or more samples over multiple clock periods, will in general reduce the uncertainty about the actual signal $C_o(t)$.

Returning again to the example shown in FIG. 3, it will be assumed that the receiver (that circuit 10 will be used with) utilizes the rising edge of the genrated clock signal (from the output of selector 22) to strobe the data. Examination of the timing diagram suggests that either $C_2(t)$ or $C_3(t)$ would be an optimum clock signal since their rising edges occur at maximum remove from the edges of each data cell (as indicated by their relationship to the frame bit). Although this is most readily visible given the timing diagram of FIG. 3, those skilled in the art will appreciate that sufficient information to choose an optimum $C_i(t)$ to use as a clock signal is provided by knowledge of $C_o(t)$, $t_o$, T and n. Knowledge of $C_o(t)$ and $t_o$ are provided by the samples $C_i(t_o)$; and T and n are constant values for a given implementation of the circuit 10. Therefore, the samples $C_i(t_o)$ provide sufficient information to the circuit 10 to properly select which of the delayed clock signals $C_i(t)$ to use as the clock signal to strobe the data.

Referring again to FIG. 2, the other elements of the clock regeneration circuit 10 operate on the samples $C_i(t_o)$ so as to select which of the generated clock signals to provide to the connected receiver logic for use in strobing data. The $(n+1)$ outputs of latch 24, $S_i$, representing and corresponding to the samples $C_i(t_o)$, are used to address a $2^{n+1}$ word read only memory (ROM) 28, each word in ROM 28 containing m-bits. When the receiver's controlling logic decides that it is appropriate to select a clock, it enables the control and delay circuit 30 via the control signals, the design of such enabling circuitry being well known to those skilled in the art. The control and delay circuit 30 also receives a signal from the frame detect circuit 26 each time a frame detect condition is recognized on the DATA-IN line. If the control and delay circuit 30 is enabled (by the control signals from the receiver) at the time a frame is detected by frame detector 26, the resulting strobe signal sent to control and delay circuit 30 by frame detect circuit 26 will cause that circuit 30 to wait a first time period sufficient for the $S_i$ outputs of latch 24 to become valid (latch 24 propagation time), then wait an additional second time period for the ROM 28 output data to become stable (ROM 28 access time), then wait a third time period for setup time on latch decoder 32 and then generate a signal which strobes the m ROM 28 output data bits into latch/decoder 32.

The read only memory 28 contains data which specifies which of the generated clock signals the receiver logic will utilize to strobe the associated incoming data. Each of the $2^{n+1}$ m-bit words in ROM 28 corresponds to one of the $2^{n+1}$ combinations of (n+1) samples $S_i$ which can be stored in latch 24 when a frame detect condition occurs. The user of the circuit 10 must individually consider each of the possible patterns of n+1 samples $S_i$ which could be latched, decide from each sample and from his knowledge of the other circuit 10 parameters, which of the n+1 clock signals $C_i(t)$ is most appropriate for the receiver to use for that sample, and code the corresponding m-bit word in ROM 28 at the address specified by the n+1 samples $S_i$ to select that $C_i(t)$. To indicate one of (n+1) possibilities requires (k+1) bits of information, where $2^{k+1} \geq n+1$. Therefore, the width of the ROM 28 word, m, must be $\geq k+1$, where $2^{k+1} \geq n+1$.

It should be noted that if the clock edge/data edge proximity requirements are such that it is sufficient to choose one of a subset of the $C_i(t)$, e.g., only every other $C_i(t)$ is available to be selected, then the number of bits m in each ROM 28 word can be reduced accordingly.

In the preferred embodiment, the m bits read out of ROM 28 and latched into latch/decoder 32, are fed to the select inputs $a_o$-$a_k$ of 1-of-(n+1) selector circuit 22. The selector circuit 22 decodes the select inputs $a_o$-$a_k$ and gates the input timing signal specified by the select inputs through selector circuit 22 and then on to the associated receiver logic. Thereafter, until another (enabled) frame detect condition occurs, the circuit 10 supplies the receiver with a timing signal delayed to optimize the conditions existing when the framing bit of the respective message (or data sequence) was received. Since the period of the framing and data bits of each message is constant, by applying the same delay to each timing bit sent to the associated receiver logic, the circuit 10 assures that the receiver will strobe each corresponding data bit at the optimum time.

Still referring to FIG. 2, if the user of the circuit 10 determines that certain of the $2^{n+1}$ possible sample patterns $S_i$ would not correspond to samples of any $C_o(t)$ which is an acceptable clock input to the associated receiver, the ROM 28 word at the address for that sample can be coded to specify an "unacceptable clock" status. This unacceptable clock pattern would be decoded by the latch/decoder 32, which in response would generate an unacceptable clock status signal which could be used by the receiver or other controlling logic (not shown) to take some remedial action. In the preferred embodiment, the unacceptable clock status signal is implemented as another decoder 32 output position (which is not connected as an input to selector 22). As will be obvious to those skilled in the art, assuming all n+1 versions of $C_i(t)$ are available for selection, implementation of the unacceptable clock status signal as another decoder 32 output would require that $2^m > n+1$, where m is the number of bit positions in each ROM 28 word.

Other requirements may also dictate that the ROM 28 word size be greater than that necessary to specify (n+1) alternatives. Thus, for example, those skilled in the art will realize that in some situations the user may desire to incorporate a parity bit, or some other error protection and/or error correction scheme, to protect against some classes of failures in the ROM 28 of latch/decoder 32.

Those skilled in the art realize that most practical selector circuits have a non-zero propagation delay. Referring again to FIG. 2, the implication is that the generated output clock from 1-of-(n+1) selector 22 is actually a delayed version of the input $C_i(t)$ which is selected to be the optimum clock. Depending on the required clock edge/data edge proximity and the component tolerances, this dalay added by the selector circuit 22 may be significant. If this selector propagation delay is known with sufficient precision, its value can be accounted for directly when the user codes the ROM 28 to select the appropriate $C_i(t)$. On the other hand, if the selector 22 delay is not known with sufficient precision for all selector circuits 22 used in manufacturing multiple copies of the whole circuit 10 using identically coded ROMs 28, the delay can be accounted for with a selector-equalizing delay 34 on the data signal. The generation of a selector equalizing delay 34 equal to the delay of selector 22 can be accomplished either by individual selection during manufacture, or by building the selector equalizing delay 34 out of components having precisely the same parameters and characteristics as the selector 22. Thus, for example, the latter might be accomplished by the selector-equalizing delay 34 being a second selector circuit on the same silicon wafer as selector 22.

Having shown and described the preferred embodiment of the present invention, those skilled in the art will realize that various omissions, substitutions and changes in form and details may be made without departing from the spirit of the invention. It is the intention, therefore, to be limited only as indicated by the scope of the following claims.

What is claimed is:

1. A synchronous clock regenerator for generating a clock signal for strobing a sequence of binary serial data, the beginning of said sequence of binary serial data including a framing pattern, said sequence of binary serial data have associated with it a raw clock signal of the same frequency as said binary serial data, said clock regenerator comprising:

delay means to delay said raw clock signal for generating a plurality of delayed versions of said raw clock signal;

address generating means, initiated by the occurrence of said framing pattern, for generating a set of signals from said generated plurality of delayed versions of said raw clock signal, said set of signals representing a generated address;

storage means, responsive to said generated address, for supplying stored data specifying one of said versions of said raw clock signal including said raw clock signal at the clock signal to be generated; and selection means coupled to both said delay means and said storage means, for gating as said generated clock signal the one of said generated plurality of delayed versions of said raw clock signal as specified by said stored data.

2. The synchronous clock regenerator in accordance with claim 1 wherein said address generating means includes:

means for detecting the occurrence of said framing pattern; and means responsive to said framing pattern detecting means for storing the values of said generated plurality of delayed versions of said raw clock signal.

3. The synchronous clock regenerator in accordance with claim 2 wherein said generated plurality of delayed versions of said raw clock signal is characterized as including said raw clock signal.

4. The synchronous clock regenerator in accordance with claim 2 wherein said storing means includes a plurality of flip-flops, the strobe input to each of said plurality of flip-flops provided by said framing pattern detecting means.

5. The synchronous clock regenerator in accordance with claim 1 wherein said generated plurality of delayed versions of said raw clock signal is characterized as including said raw clock signal.

6. The synchronous clock regenerator in accordance with claim 1 or 5 wherein said selection means includes:

latch-decoder means connected to the output of said storage means, said latch/decoder means including means for decoding said stored data; and gating means, connected to said delay means and responsive to said decoded stored data for gating as the generated clock signal that one of the generated plurality of delayed versions of said raw clock signal is specified by said decoded stored data.

7. The synchronous clock regenerator in accordance with claim 6 wherein said address generating means includes:

means for detecting the occurrence of said framing pattern; and means, responsive to said framing pattern detecting means, for storing the values of said generated plurality of delayed versions of said raw clock signal.

8. The synchronous clock regenerator in accordance with claim 6 further including control and delay means, connected between said address generating means and said latch/decoder means, for enabling said latch/decoder means after allowing sufficient time for the output of such storage means to become valid.

9. The synchronous clock regenerator in accordance with claim 6 further including selector-equalizing delay means for inserting on said binary serial data signal a delay equivalent to that included in said generated timing signal due to the delay added by said gating means.

10. The synchronous clock regenerator in accordance with claim 6 wherein said delay means includes a tapped delay line.

11. The synchronous clock regenerator in accordance with claim 10 wherein said tapped delay line is characterized as having a total delay approximately equal to the maximum expected clock period of said raw clock signal.

12. The synchronous clock regenerator in accordance with claim 6 wherein said latch/decoder means further includes means, responsive to specified stored data, for indicating that no one of said generated plurality of delayed versions of said raw clock signal provides an acceptable clocking signal to allow reliable strobing of said binary serial data.

* * * * *

UNITED STATES PATENT AND TRADEMARK OFFICE
CERTIFICATE OF CORRECTION

PATENT NO. : 4,415,984
DATED : November 15, 1983
INVENTOR(S) : Dana A. Gryger and Daniel P. Drogichen It is certified that error appears in the above-identified patent and that said Letters Patent is hereby corrected as shown below:

Col. 6, line 12, change "bein" to --being--.

Col. 7, line 6, change "sucn" to --such--.

Claim 1, Col. 9, line 4, change "at" to --as--.

Signed and Sealed this

Thirty-first Day of January 1984

[SEAL]

Attest:

GERALD J. MOSSINGHOFF

Attesting Officer    Commissioner of Patents and Trademarks